(12) United States Patent
Sakhnini et al.

(10) Patent No.: US 11,483,841 B2
(45) Date of Patent: Oct. 25, 2022

(54) DMRS-BASED BEAM MANAGEMENT FOR DOWNLINK REPETITION

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US); Wooseok Nam, San Diego, CA (US); Jelena Damnjanovic, Del Mar, CA (US); Mahmoud Taherzadeh Boroujeni, San Diego, CA (US); Juan Montojo, San Diego, CA (US); Peter Gaal, San Diego, CA (US); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/247,607

(22) Filed: Dec. 17, 2020

(65) Prior Publication Data

US 2021/0282148 A1    Sep. 9, 2021

Related U.S. Application Data

(60) Provisional application No. 62/985,821, filed on Mar. 5, 2020.

(51) Int. Cl.
| | | |
|---|---|---|
| *H04W 72/04* | (2009.01) | |
| *H04W 24/10* | (2009.01) | |
| *H04L 5/00* | (2006.01) | |
| *H04L 27/26* | (2006.01) | |
| *H04L 1/18* | (2006.01) | |
| *H04B 7/0456* | (2017.01) | |
| *H04W 72/14* | (2009.01) | |
| *H04B 7/06* | (2006.01) | |

(52) U.S. Cl.
CPC ...... *H04W 72/0493* (2013.01); *H04B 7/0486* (2013.01); *H04B 7/0626* (2013.01); *H04L 1/1819* (2013.01); *H04L 5/0051* (2013.01); *H04L 5/0055* (2013.01); *H04L 27/2613* (2013.01); *H04W 24/10* (2013.01); *H04W 72/0453* (2013.01); *H04W 72/14* (2013.01)

(58) Field of Classification Search
None
See application file for complete search history.

(56) References Cited

U.S. PATENT DOCUMENTS 11,405,911 B2 *   8/2022   Zhang ................... H04L 5/005
2019/0082346 A1 * 3/2019   Tang .................... H04B 7/0626
(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a user equipment (UE) may perform respective measurements of one or more demodulation reference signals (DMRSs). Each of the one or more DMRSs may be associated with a repetition of a downlink transmission. Each of the one or more DMRSs may be transmitted on a narrow beam that is located within a wide beam associated with a transmission configuration indication indicated in a grant for the downlink transmission. The UE may transmit an indication of one or more of the respective measurements. Numerous other aspects are provided.

30 Claims, 6 Drawing Sheets

(56) References Cited

U.S. PATENT DOCUMENTS

| | | | |
|---|---|---|---|
| 2020/0112419 A1* | 4/2020 | Bagheri | H04L 5/0048 |
| 2021/0297993 A1* | 9/2021 | Yuan | H04L 5/0094 |
| 2022/0095137 A1* | 3/2022 | Sakhnini | H04L 5/0048 |
| 2022/0140872 A1* | 5/2022 | Wernersson | H04B 7/0626 370/329 |
| 2022/0140967 A1* | 5/2022 | Khoryaev | H04L 5/0012 375/220 |
| 2022/0247538 A1* | 8/2022 | Farag | H04L 5/0053 |

* cited by examiner

DMRS-BASED BEAM MANAGEMENT FOR DOWNLINK REPETITION

CROSS-REFERENCE TO RELATED APPLICATION

This Patent Application claims priority to U.S. Provisional Patent Application No. 62/985,821, filed on Mar. 5, 2020, entitled "DMRS-BASED BEAM MANAGEMENT FOR DOWNLINK REPETITION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal (DMRS)-based beam management for downlink repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include performing respective measurements of one or more demodulation reference signals (DMRSs), wherein each of the one or more DMRSs is associated with a repetition of a downlink transmission, and wherein each of the one or more DMRSs is transmitted on a narrow beam that is located within a wide beam associated with a transmission configuration indication (TCI) indicated in a grant for the downlink transmission; and transmitting an indication of one or more of the respective measurements.

In some aspects, a method of wireless communication, performed by a base station (BS), may include transmitting one or more DMRSs on a narrow beam that is located within a wide beam associated with a TCI indicated in a grant for a downlink transmission associated with the one or more DMRSs, wherein each of the DMRSs is associated with a repetition of a downlink transmission; and receiving an indication of respective measurements of at least a subset of the one or more DMRSs.

In some aspects, a UE for wireless communication may include a memory and one or more processors operatively coupled to the memory. The memory and the one or more processors may be configured to perform respective measurements of one or more DMRSs, wherein each of the one or more DMRSs is associated with a repetition of a downlink transmission, and wherein each of the one or more DMRSs is transmitted on a narrow beam that is located within a wide beam associated with a TCI indicated in a grant for the downlink transmission; and transmit an indication of one or more of the respective measurements.

In some aspects, a BS for wireless communication may include a memory and one or more processors operatively coupled to the memory. The memory and the one or more processors may be configured to transmit one or more DMRSs on a narrow beam that is located within a wide beam associated with a TCI indicated in a grant for a downlink transmission associated with the one or more DMRSs, wherein each of the DMRSs is associated with a repetition of a downlink transmission; and receive an indication of respective measurements of at least a subset of the one or more DMRSs.

In some aspects, a non-transitory computer-readable medium may store one or more instructions for wireless communication. The one or more instructions, when executed by one or more processors of a UE, may cause the one or more processors to perform respective measurements of one or more DMRSs, wherein each of the one or more DMRSs is associated with a repetition of a downlink transmission, and wherein each of the one or more DMRSs is transmitted on a narrow beam that is located within a wide beam associated with a TCI indicated in a grant for the downlink transmission; and transmit an indication of one or more of the respective measurements.

In some aspects, a non-transitory computer-readable medium may store one or more instructions for wireless communication. The one or more instructions, when executed by one or more processors of a BS, may cause the one or more processors to transmit one or more DMRSs on a narrow beam that is located within a wide beam associated with a TCI indicated in a grant for a downlink transmission associated with the one or more DMRSs, wherein each of the DMRSs is associated with a repetition of a downlink transmission; and receive an indication of respective measurements of at least a subset of the one or more DMRSs.

In some aspects, an apparatus for wireless communication may include means for performing respective measurements of one or more DMRSs, wherein each of the one or more DMRSs is associated with a repetition of a downlink transmission, and wherein each of the one or more DMRSs is transmitted on a narrow beam that is located within a wide beam associated with a TCI indicated in a grant for the downlink transmission; and means for transmitting an indication of one or more of the respective measurements.

In some aspects, an apparatus for wireless communication may include means for transmitting one or more DMRSs on a narrow beam that is located within a wide beam associated with a TCI indicated in a grant for a downlink transmission associated with the one or more DMRSs, wherein each of the DMRSs is associated with a repetition of a downlink transmission; and means for receiving an indication of respective measurements of at least a subset of the one or more DMRSs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
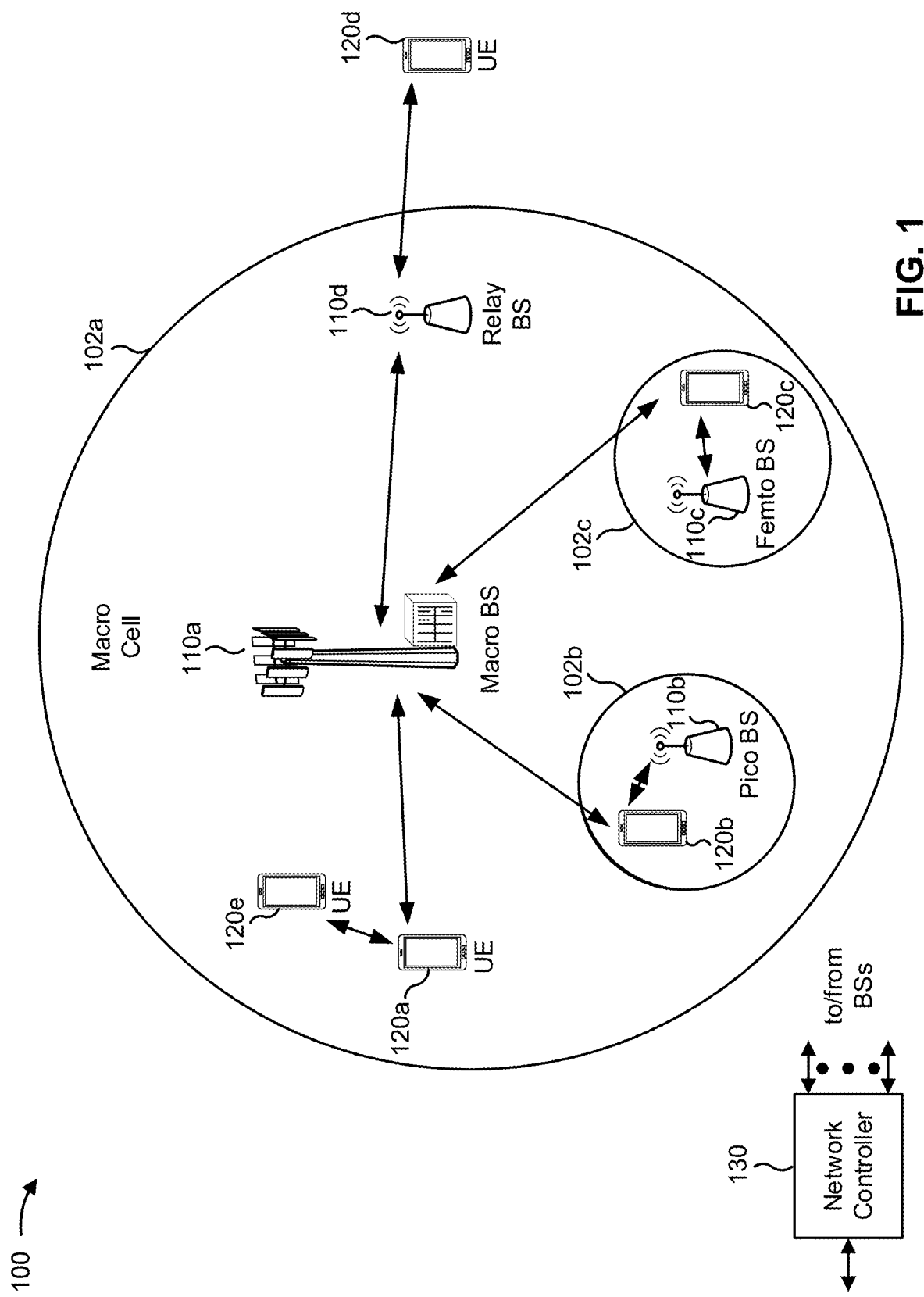
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
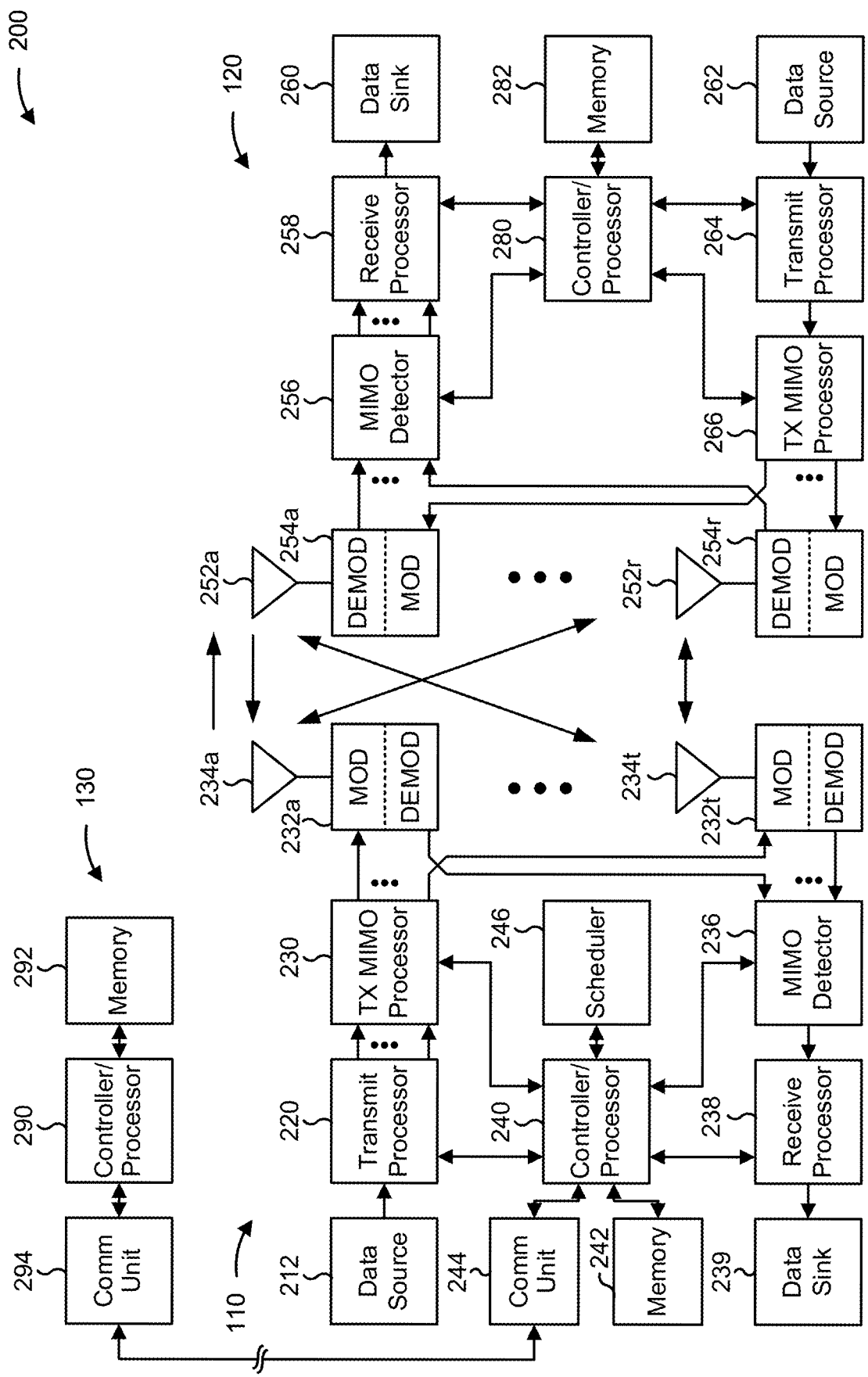
FIG. 2 is a diagram illustrating an example of a base station (BS) in communication with a user equipment (UE) in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with demodulation reference signal (DMRS)-based beam management for downlink repetition, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for performing respective measurements of one or more DMRSs, wherein each of the one or more DMRSs is associated with a repetition of a downlink transmission, and wherein each of the one or more DMRSs is transmitted on a narrow beam that is located within a wide beam associated with a transmission configuration indication (TCI) indicated in a grant for the downlink transmission, means for transmitting an indication of one or more of the respective measurements, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting one or more DMRSs on a narrow beam that is located within a wide beam associated with a TCI indicated in a grant for a downlink transmission associated with the one or more DMRSs, wherein each of the DMRSs is associated with a repetition of a downlink transmission, means for receiving an indication of respective measurements of at least a subset of the one or more DMRSs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some cases, a UE may be a reduced capability UE, an NR-light UE, or another type of device having reduced or lower capabilities relative to other UEs. For example, a reduced capability UE may be equipped with fewer transmit and/or receive antennas, may be equipped with a lower-capability battery, may be equipped with fewer processing and/or memory resources (which may result in longer processing timelines), may be capable of monitoring and/or processing only a reduced frequency bandwidth, may be capable of only half-duplex frequency division duplexing, and/or the like. In some cases, a reduced capability UE may have reduced capabilities due to a small form factor, due to keeping the cost of the reduced capability UE low, and/or the like. Examples of reduced capability UEs may include IoT devices, biometric sensors/devices, smart watches, smart clothing, smart glasses, smart wrist bands, smart jewelry, vehicular components or sensors (e.g., cellular-enabled onboard diagnostic (OBD) devices), smart meters/sensors, and/or the like.

In some cases, a BS may perform various techniques for beam management for a reduced-capability UE. For example, the BS may transmit a plurality of instances of a synchronization signal block (SSB) or channel state information reference signal (CSI-RS) using different transmit beams of the BS. The reduced-capability UE may measure each instance and report the measurement results to the BS. The BS may identify a beam based at least in part on the reported measurement results, and may perform subsequent downlink transmission(s) using the beam.

In some aspects described herein, a BS may perform various techniques to facilitate coverage recovery for coverage reductions that result from device complexity reduction of a reduced-capability UE. For example, to improve coverage for a reduced-capability UE, the BS may schedule a plurality of repetitions of a downlink transmission (e.g., a physical downlink control channel (PDCCH) transmission, a physical downlink shared channel (PDSCH) transmission, and/or the like). The BS may transmit the plurality of repetitions of the downlink transmission to the UE to increase the likelihood that the UE downlink transmission is decodable for the UE. Each repetition may repeat the downlink transmission so that the UE may combine two or more of the repetitions to obtain a decodable version of the downlink transmission.

Moreover, in some aspects described herein, the BS may take advantage of the repetitive nature of a downlink transmission for a reduced-capability UE in order to perform DMRS-based beam management for the reduced-capability UE. For example, the BS may transmit a DMRS for each repetition of the downlink transmission on a narrow beam (e.g., a narrow transmit beam of the BS). Each narrow beam may be located within a wide beam associated with the downlink transmission. The UE may measure the DMRSs on the narrow beams and may report the measurement results to the BS. In this way, the DMRSs associated with repetitions of a downlink transmission may be used for beam management for a UE, which reduces the need for the BS to transmit additional SSBs and/or CSI-RSs for beam management. This, in turn, reduces processing, memory, and radio resource consumption of the BS.

Figure 3:
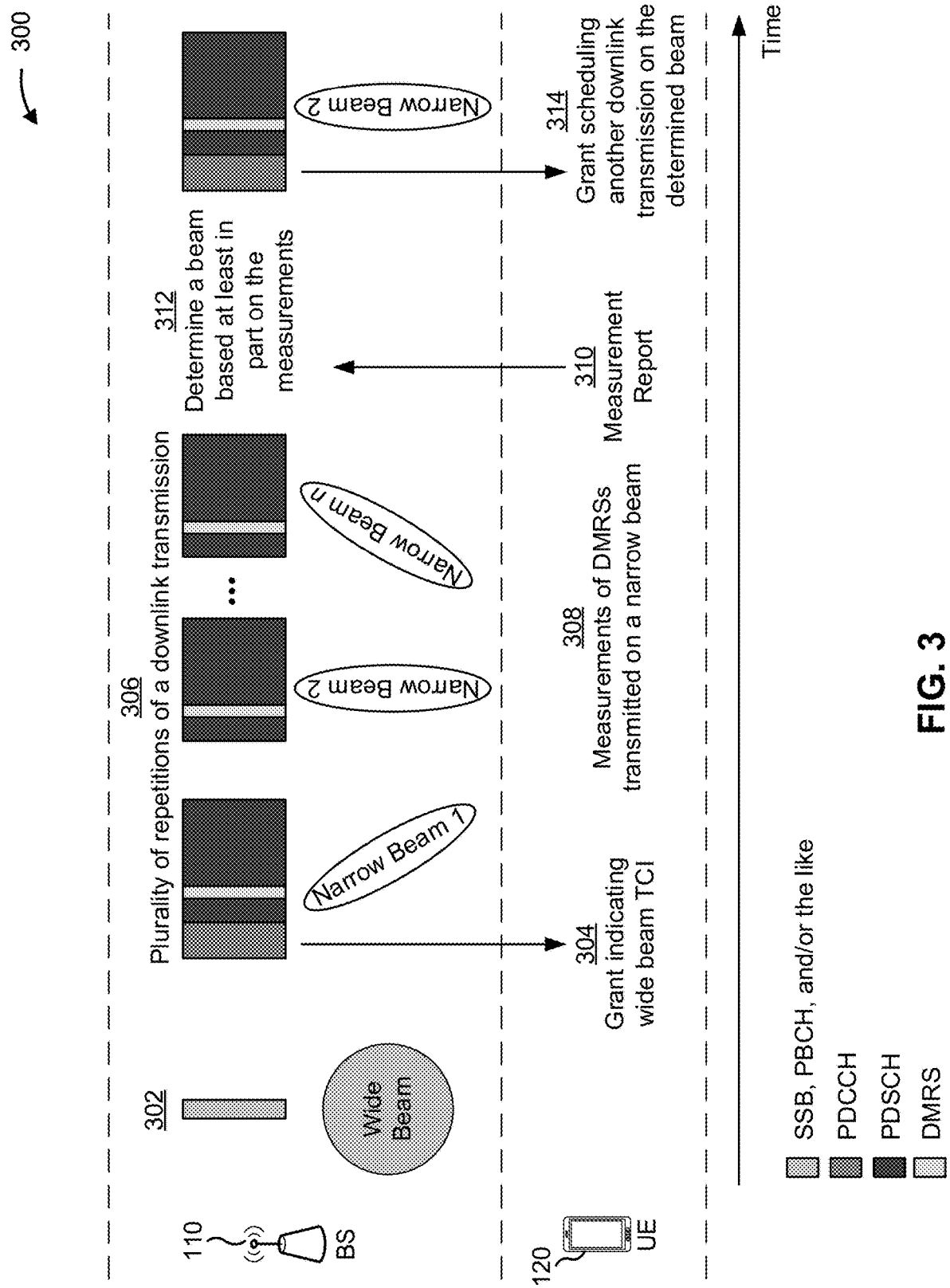
FIGS. 3 and 4 are diagrams illustrating examples of demodulation reference signal (DMRS) based beam management for downlink repetition, in accordance with various aspects of the present disclosure.

FIG. 3 is a diagram illustrating one or more examples 300 of DMRS-based beam management for downlink repetition, in accordance with various aspects of the present disclosure. As shown in FIG. 3, example(s) 300 may include communication between a UE 120 and a BS 110. The UE 120 and the BS 110 may be included in a wireless network, such as wireless network 100. The UE 120 and the BS 110 may communicate via a wireless access link, which may be include a downlink and an uplink.

In example(s) 300, the BS 110 performs beam management for the UE 120. Beam management may include, for example, identifying or selecting transmit beams (e.g., beams used by the BS 110) on which to transmit downlink transmissions to the UE 120. In some aspects, the BS 110 selects or identifies a beam for downlink transmission based at least in part on one or more measurements performed by the UE 120. The one or more measurements may include, for example, RSRP measurements, RSSI measurements, RSRQ measurements, CQI measurements, and/or the like.

As shown in FIG. 3, and by reference number 302, the BS 110 may transmit on a wide beam (e.g., a wide transmit beam). For example, the BS 110 may transmit one or more SSBs on the wide beam, may transmit one or more physical broadcast channel (PBCH) communications on the wide beam, and/or the like. The SSBs and/or PBCH communications may include system information, such as a master information block (MIB), one or more system information blocks (SIBs), and/or the like. UEs, such as the UE 120, may use the system information to establish a connection with the BS 110 (e.g., by performing a random access channel (RACH) procedure based at least in part on the system information).

As further shown in FIG. 3, and by reference number 304, the BS 110 may transmit a grant (e.g., a downlink grant) that schedules a plurality of repetitions of a downlink transmission to UE 120. The downlink transmission may be a PDSCH transmission, a PDCCH transmission, and/or the like. The grant may be included in downlink control information (DCI) of a PDCCH, may be a radio resource control (RRC) semi-persistent grant, may be included in a control resource set (CORESET) configuration, and/or the like. The grant may indicate the time domain and/or frequency domain resources in which each repetition of the downlink transmission is to be transmitted. Moreover, the grant may indicate time domain and/or frequency domain resources in which the BS 110 is to transmit a DMRS for each repetition of the downlink transmission.

In some aspects, the grant indicates a TCI for the downlink transmission. The TCI may be associated with the wide beam of the BS 110. More particularly, the TCI may indicate a QCL relationship for the DMRSs of the downlink transmission and the wide beam of the BS 110. For example, the QCL relationship may indicate a correlation between channel properties (e.g., Doppler shift, Doppler spread, average delay, delay spread, spatial relation, and/or the like) of the wide beam and channel properties of narrow beams on which the BS 110 is to transmit the DMRSs.

As further shown in FIG. 3, and by reference number 306, the BS 110 may transmit the plurality of repetitions of the downlink transmission. For example, the BS 110 may transmit each repetition in the time domain resources and/or the frequency domain resources indicated for the repetition in the grant. Moreover, the BS 110 may beam sweep the DMRSs for the plurality of repetitions of the downlink transmission across narrow beams (e.g., narrow transmit beams of the BS 110). In these cases, the BS 110 may transmit the DMRS for each respective repetition on a different narrow beam. For example, the BS 110 may transmit the DMRS for the first repetition on a first narrow beam (e.g., Narrow Beam 1), may transmit the DMRS for the second repetition on a second narrow beam (e.g., Narrow Beam 2), and so on through Narrow Beam n.

The narrow beams may be located within the wide beam of the BS 110. Each narrow beam may be quasi-co-located (QCL'ed) with an existing or configured narrow beam of the BS 110 for transmission of a CSI-RS, a tracking reference signal (TRS), or another type of reference signal. In other words, each narrow beam on which the BS 110 transmits a DMRS for a repetition of the downlink transmission may experience similar channel properties and/or conditions (e.g., Doppler shift, Doppler spread, average delay, delay spread, spatial relation, and/or the like) as another narrow beam that is already configured for transmission of another type of reference signal such as a CSI-RS or TRS.

As further shown in FIG. 3, and by reference number 308, the UE 120 may measure each DMRS that BS 110 transmits for a repetition of the downlink transmission. In some aspects, the UE 120 performs the measurements of the DMRSs based at least in part on an indication, in the grant for the downlink transmission, to perform the measurements. In some aspects, the UE 120 performs the measurements of the DMRs based at least in part on being configured or programmed to perform the measurements.

The measurements of the DMRSs may be used for beam management for the UE 120. Accordingly, the measurement of a DMRS may be an RSRP measurement or similar type of measurement that indicates the received power of the DMRS on the narrow beam on which the DMRS was transmitted. For example, the RSRP measurement for the DMRS of the first repetition of the downlink transmission may indicate a received power on Narrow Beam 1, the RSRP measurement for the DMRS of the second repetition of the downlink transmission may indicate a received power on Narrow Beam 2, and so on through Narrow Beam n.

As further shown in FIG. 3, and by reference number 310, the UE 120 may transmit an indication of the measurements in a measurement report to the BS 110. In some aspects, the UE 120 may multiplex and transmit the measurement report with other types of information, such as an existing or configured CSI report, an existing or configured hybrid automatic repeat request acknowledgement (HARQ-ACK) message, and/or the like. In some aspects, the UE 120 may transmit the measurement report as a separate or standalone beam measurement report. In these cases, the BS 110 may transmit an uplink grant to the UE 120, and the UE 120 may transmit the measurement report using the time domain and/or the frequency domain resources scheduled by the uplink grant.

In some aspects, the UE 120 is configured to perform MIMO communications. In these cases, the UE 120 may transmit an indication of the measurements on one or more DMRS ports configured for the UE 120. The UE 120 may determine a MIMO rank for the downlink transmission and may determine whether the MIMO rank satisfies a rank threshold (e.g., a MIMO rank higher than 1). In these cases, if the MIMO rank of the downlink transmission satisfies the rank threshold, the UE 120 may transmit the indication of the measurements on each DMRS port configured for the UE 120, on the highest ranked DMRS port configured for the UE 120, or on one or more combined DMRS ports configured for the UE 120. In some aspects, the BS 110 configures or specifies which DMRS ports the UE 120 is to use to transmit the indication of the measurements. The BS 110 may indicate which DMRS ports the UE 120 is to use to transmit the indication of the measurements in the grant that schedules the downlink transmission or in another downlink communication (e.g., a DCI communication, an RRC communication, or a medium access control control element (MAC-CE) communication).

In some aspects, the UE 120 is deployed in a multi-transmit receive point (TRP) configuration, a multi-panel configuration, or another type of configuration in which the UE 120 is assigned to a plurality of QCL groups. Each QCL group may have a different PDSCH rank. Moreover, each QCL group may be associated with one or more TRPs that are QCL'ed. In these cases, the UE 120 may measure DMRSs transmitted on narrow beams and may transmit measurement reports for each QCL group. Moreover, the UE 120 may transmit the measurement report for each QCL group on one or more DMRS ports, as described above.

As further shown in FIG. 3, and by reference number 312, the BS 110 may receive the indication of the measurements of the DMRSs transmitted on the narrow beams and may determine a beam (e.g., a transmit beam for the BS 110) based at least in part on the measurements. In some aspects, the BS 110 selects the best beam or the beam having the highest or best associated measurement from the narrow beams on which the BS 110 transmitted the DMRSs. In some aspects, the BS 110 selects the beam, from the narrow beams on which the BS 110 transmitted the DMRSs, having an associated measurement that satisfies a measurement threshold, such as an RSRP threshold, an RSSI threshold, an RSRQ threshold, a CQI threshold, and/or the like. In some aspects, the BS 110 configures a new narrow beam or a refined beam based at least in part on the measurements. The determined beam may be QCL'ed with an existing or configured narrow beam (e.g., a beam configured for transmission of a CSI-RS, a TRS, or another type of reference signal) of the BS 110.

As further shown in FIG. 3, and by reference number 314, the BS 110 transmits, to the UE 120, a grant scheduling another downlink transmission on the determined beam (e.g., Narrow Beam 2 in the example illustrated in FIG. 3). The grant may be included in DCI of a PDCCH and may indicate a TCI associated with the determined beam. The BS 110 may transmit the other downlink transmission on the determined beam in the time domain resources and/or the frequency domain resources scheduled by the grant.

In this way, the BS 110 may transmit a DMRS for each repetition of the downlink transmission on a narrow beam, and the UE 120 may measure the DMRSs on the narrow beams and report the measurement results to the BS 110. In this way, the DMRSs associated with repetitions of a downlink transmission may be used for beam management for the UE 120, which reduces the need for the BS 110 to transmit additional SSBs and/or CSI-RSs for beam management. This, in turn, reduces processing, memory, and radio resource consumption of the BS 110.

As indicated above, FIG. 3 is provided as one or more examples. Other examples may differ from what is described with respect to FIG. 3. As an example, while FIG. 3 illustrates example(s) 300 as including narrow beams 1 through n, example(s) 300 may include DMRS transmissions on greater or fewer quantities of narrow beams.

Figure 4:
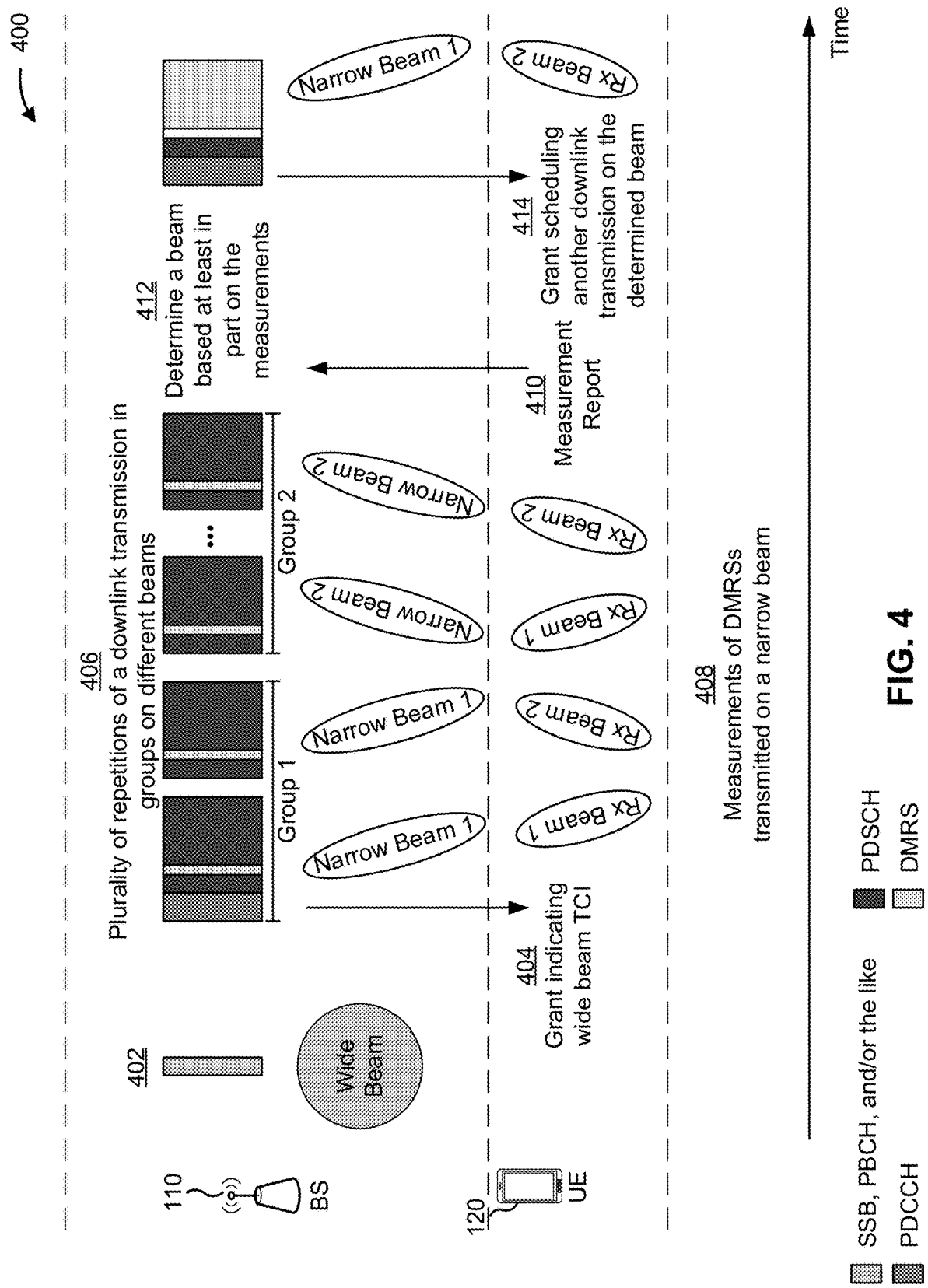

FIG. 4 is a diagram illustrating one or more examples 400 of DMRS-based beam management for downlink repetition, in accordance with various aspects of the present disclosure. As shown in FIG. 4, example(s) 400 may include communication between a UE 120 and a BS 110. The UE 120 and the BS 110 may be included in a wireless network, such as wireless network 100. The UE 120 and the BS 110 may communicate via a wireless access link, which may be include a downlink and an uplink.

In example(s) 400, the BS 110 performs beam management for the UE 120. Beam management may include, for example, identifying or selecting transmit beams (e.g., beams used by the BS 110) on which to transmit downlink transmissions to the UE 120. In some aspects, the BS 110 selects or identifies a beam for downlink transmission based at least in part on one or more measurements performed by the UE 120. The one or more measurements may include, for example, RSRP measurements, RSSI measurements, RSRQ measurements, CQI measurements, and/or the like.

As shown in FIG. 4, and by reference number 402, the BS 110 may transmit on a wide beam (e.g., a wide transmit beam). For example, the BS 110 may transmit one or more SSBs on the wide beam, may transmit one or more PBCH communications on the wide beam, and/or the like. The SSBs and/or PBCH communications may include system information, such as a MIB, one or more SIBs, and/or the like. UEs, such as the UE 120, may use the system information to establish a connection with the BS 110 (e.g., by performing a RACH procedure based at least in part on the system information).

As further shown in FIG. 4, and by reference number 404, the BS 110 may transmit a grant (e.g., a downlink grant) that schedules a plurality of repetitions of a downlink transmission to UE 120. The downlink transmission may be a PDSCH transmission, a PDCCH transmission, and/or the like. The grant may be included in DCI of a PDCCH, may be a radio resource control (RRC) semi-persistent grant, may be included in a CORESET configuration, and/or the like. The grant may indicate the time domain and/or frequency domain resources in which each repetition of the downlink transmission is to be transmitted. Moreover, the grant may indicate time domain and/or frequency domain resources in which the BS 110 is to transmit a DMRS for each repetition of the downlink transmission.

In some aspects, the grant indicates a TCI for the downlink transmission. The TCI may be associated with the wide beam of the BS 110. More particularly, the TCI may indicate a QCL relationship for the DMRSs of the downlink transmission and the wide beam of the BS 110. For example, the QCL relationship may indicate a correlation between channel properties (e.g., Doppler shift, Doppler spread, average delay, delay spread, spatial relation, and/or the like) of the wide beam and channel properties of narrow beams on which the BS 110 is to transmit the DMRSs.

As further shown in FIG. 4, and by reference number 406, the BS 110 may transmit the plurality of repetitions of the downlink transmission. For example, the BS 110 may transmit each repetition in the time domain resources and/or the frequency domain resources indicated for the repetition in the grant. Moreover, the BS 110 may beam sweep the DMRSs across a plurality of groups of repetitions of the downlink transmission. For example, the BS 110 may transmit DMRSs for a first subset of repetitions (e.g., Group 1) on a first narrow beam (e.g., Narrow Beam 1), may transmit DMRSs for a second subset of repetitions (e.g., Group 2) on a second narrow beam (e.g., Narrow Beam 2), and so on.

Beam sweeping the DMRSs across groups of repetitions permits the UE 120 to perform beam management for receive beams of the UE 120. For example, and as illustrated in FIG. 4, the UE 120 may beam sweep receive beams of the UE 120 within each group of repetitions of the downlink transmission. In other words, the UE 120 may use a first receive beam (e.g., Rx Beam 1) to receive a first DMRS transmitted on Narrow Beam 1 in Group 1 and may use a second receive beam (e.g., Rx Beam 2) to receive a second DMRS transmitted on Narrow Beam 1 in Group 1. Similarly, the UE 120 may use the first receive beam (e.g., Rx Beam 1) to receive a first DMRS transmitted on Narrow Beam 2 in Group 2 and may use the second receive beam (e.g., Rx Beam 2) to receive a second DMRS transmitted on Narrow Beam 2 in Group 2. In this way, the UE 120 may measure each possible combination of narrow beams and receive beams across the plurality of repetitions of the downlink transmission.

The narrow beams may be located within the wide beam of the BS 110. Each narrow beam may be QCL'ed with an existing or configured narrow beam of the BS 110 for transmission of a CSI-RS, a TRS, or another type of reference signal. In other words, each narrow beam on which the BS 110 transmits a DMRS for a repetition of the downlink transmission may experience similar channel properties and/or conditions (e.g., Doppler shift, Doppler spread, average delay, delay spread, spatial relation, and/or the like) as another narrow beam that is already configured for transmission of another type of reference signal such as a CSI-RS or TRS.

As further shown in FIG. 4, and by reference number 408, the UE 120 may measure each DMRS that BS 110 transmits for a repetition of the downlink transmission. In some aspects, the UE 120 performs the measurements of the DMRSs based at least in part on an indication, in the grant for the downlink transmission, to perform the measurements. In some aspects, the UE 120 performs the measurements of the DMRs based at least in part on being configured or programmed to perform the measurements.

As indicated above, the UE 120 may measure the DMRS for each combination of narrow beam and receive beam. The measurement of a DMRS may be an RSRP measurement or similar type of measurement that indicates the received power of the DMRS on a narrow beam on which the DMRS was transmitted and on a receive beam on which the DMRS was received. For example, the RSRP measurement for the DMRS of the first repetition of the downlink transmission may indicate a received power on the combination of Narrow Beam 1 and RX Beam 1, the RSRP measurement for the DMRS of the first repetition of the downlink transmission may indicate a received power on the combination of Narrow Beam 1 and Rx Beam 2, and so on.

As further shown in FIG. 4, and by reference number 410, the UE 120 may transmit an indication of the measurements in a measurement report to the BS 110. In some aspects, the UE 120 may multiplex and transmit the measurement report with other types of information, such as an existing or configured CSI report, an existing or configured HARQ-ACK message, and/or the like. In some aspects, the UE 120 may transmit the measurement report as a separate or standalone beam measurement report. In these cases, the BS 110 may transmit an uplink grant to the UE 120, and the UE 120 may transmit the measurement report using the time domain and/or the frequency domain resources scheduled by the uplink grant.

In some aspects, the UE 120 is configured to perform MIMO communications. In these cases, the UE 120 may transmit an indication of the measurements on one or more DMRS ports configured for the UE 120. The UE 120 may determine a MIMO rank for the downlink transmission and may determine whether the MIMO rank satisfies a rank threshold (e.g., a MIMO rank higher than 1). In these cases, if the MIMO rank of the downlink transmission satisfies the rank threshold, the UE 120 may transmit the indication of the measurements on each DMRS port configured for the UE 120, on the highest ranked DMRS port configured for the UE 120, or on one or more combined DMRS ports configured for the UE 120. In some aspects, the BS 110 configures or specifies which DMRS ports the UE 120 is to use to transmit the indication of the measurements. The BS 110 may indicate which DMRS ports the UE 120 is to use to transmit the indication of the measurements in the grant that schedules the downlink transmission or in another downlink communication (e.g., a DCI communication, an RRC communication, or a MAC-CE communication.

In some aspects, the UE 120 is deployed in a multi-TRP configuration, a multi-panel configuration, or another type of configuration in which the UE 120 is assigned to a plurality of QCL groups. Each QCL group may have a different PDSCH rank. Moreover, each QCL group may be associated with one or more TRPs that are QCL'ed. In these cases, the UE 120 may measure DMRSs transmitted on narrow beams and may transmit measurement reports for each QCL group. Moreover, the UE 120 may transmit the measurement report for each QCL group on one or more DMRS ports, as described above.

In some aspects, the UE 120 transmits one measurement report per group of repetitions of the downlink transmission. For example, the UE 120 may transmit one measurement report for Group 1, may transmit one measurement report for Group 2, and so on. In these cases, the measurement report transmitted for a group of repetitions may include the best or highest measurement for the group. For example, if the combination of Narrow Beam 1 and Rx Beam 2 results in the best or highest RSRP measurement for Group 1, the UE 120 may include the RSRP measurement for the combination of Narrow Beam 1 and Rx Beam 2 in the measurement report for Group 1. In some aspects, the UE 120 includes all measurements within each group in the measurement report. In these cases, the measurement report include the measurement for the combination of Narrow Beam 1 and Rx Beam 1, the measurement for the combination of Narrow Beam 1 and Rx Beam 2, and so on.

As further shown in FIG. 4, and by reference number 412, the BS 110 may receive the indication of the measurements of the DMRSs transmitted on the narrow beams and may determine a beam (e.g., a transmit beam for the BS 110) based at least in part on the measurements. In some aspects, the BS 110 selects the best beam or the beam having the highest or best associated measurement from the narrow beams on which the BS 110 transmitted the DMRSs. In some aspects, the BS 110 selects the beam, from the narrow beams on which the BS 110 transmitted the DMRSs, having an associated measurement that satisfies a measurement threshold, such as an RSRP threshold, an RSSI threshold, an RSRQ threshold, a CQI threshold, and/or the like. In some aspects, the BS 110 configures a new narrow beam or a refined beam based at least in part on the measurements. The determined beam may be QCL'ed with an existing or configured narrow beam (e.g., a beam configured for transmission of a CSI-RS, a TRS, or another type of reference signal) of the BS 110.

As further shown in FIG. 4, and by reference number 414, the BS 110 transmits, to the UE 120, a grant scheduling another downlink transmission on the determined beam (e.g., Narrow Beam 1 in the example illustrated in FIG. 4). The grant may be included in DCI of a PDCCH and may indicate a TCI associated with the determined beam. The BS 110 may transmit the other downlink transmission on the determined beam in the time domain resources and/or the frequency domain resources scheduled by the grant. Moreover, the UE 120 may receive the other downlink transmission using the receive beam (e.g., Rx Beam 2) that the UE 120 determined to be the best beam for use with Narrow Beam 1.

In this way, the BS 110 may transmit a DMRS for each repetition of the downlink transmission on a narrow beam, and the UE 120 may measure the DMRSs on the narrow beams and report the measurement results to the BS 110. In this way, the DMRSs associated with repetitions of a downlink transmission may be used for beam management for the UE 120, which reduces the need for the BS 110 to transmit additional SSBs and/or CSI-RSs for beam management. This, in turn, reduces processing, memory, and radio resource consumption of the BS 110.

Moreover, in this way, the BS 110 may beam sweep the DMRSs across groups of repetitions of the downlink transmission. This permits the UE 120 to beam sweep receive beams of the UE 120 within each group so that the UE 120 may perform beam management of the receive beams of the UE 120.

As indicated above, FIG. 4 is provided as one or more examples. Other examples may differ from what is described with respect to FIG. 4. As an example, while FIG. 4 illustrates example(s) 400 as including a particular quantity of narrow beams, a particular quantity of receive beams, and a particular quantity of groups of repetitions of a downlink transmission, example(s) 400 may include greater and/or fewer quantities of narrow beams, receive beams, and/or groups of repetitions of a downlink transmission. Moreover, the groups of repetitions of a downlink transmission may include the quantity of repetitions, different quantities of repetitions, or a combination thereof.

Figure 5:
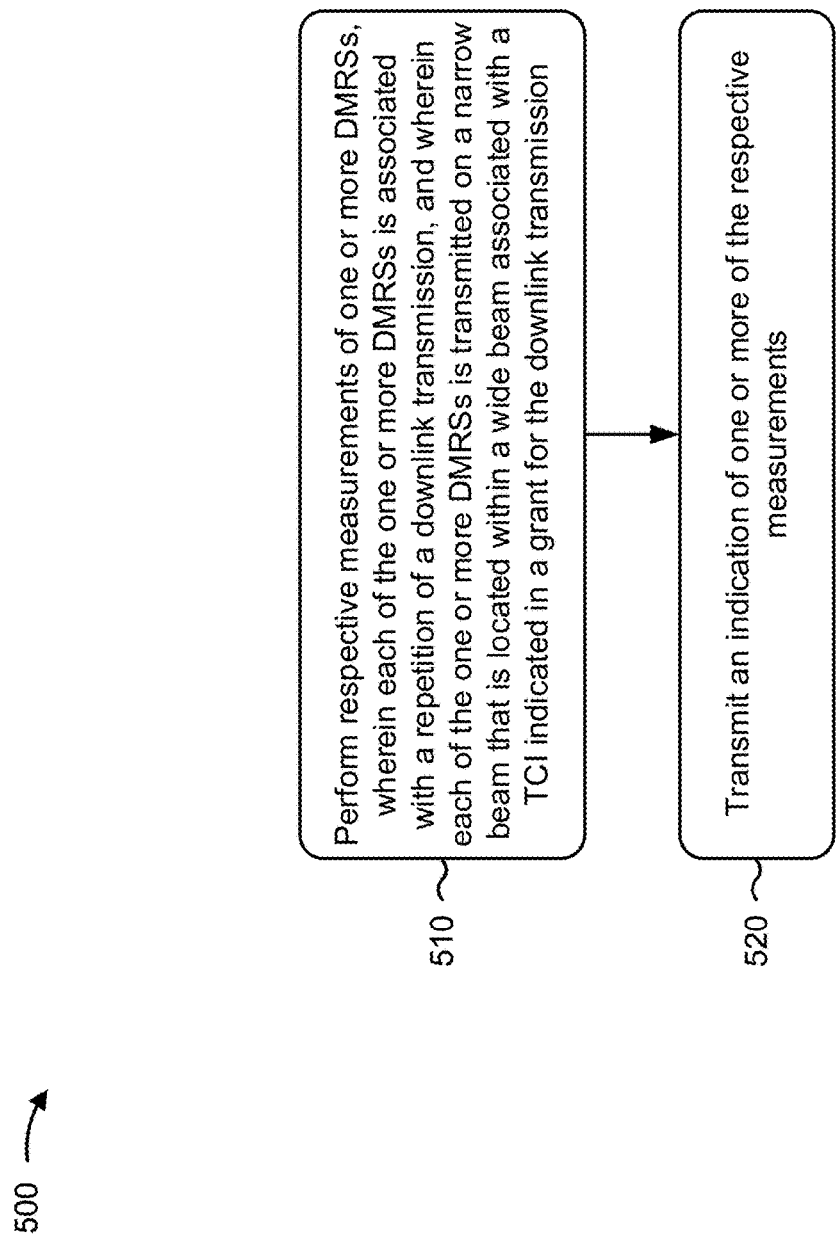
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 illustrated and described above in connection with one or more of FIGS. 1-4) performs operations associated with DMRS-based beam management for downlink repetition.

As shown in FIG. 5, in some aspects, process 500 may include performing respective measurements of one or more DMRSs, wherein each of the one or more DMRSs is associated with a repetition of a downlink transmission, and wherein each of the one or more DMRSs is transmitted on a narrow beam that is located within a wide beam associated with a TCI indicated in a grant for the downlink transmission (block 510). For example, the UE (e.g., using receive processor 258, transmit processor 264, controller/processor 280, memory 282, and/or the like) may perform respective measurements of one or more DMRSs, as described above. In some aspects, each of the one or more DMRSs is associated with a repetition of a downlink transmission. In some aspects, each of the one or more DMRSs is transmitted on a narrow beam that is located within a wide beam associated with a TCI indicated in a grant for the downlink transmission.

As further shown in FIG. 5, in some aspects, process 500 may include transmitting an indication of one or more of the respective measurements (block 520). For example, the UE (e.g., using receive processor 258, transmit processor 264, controller/processor 280, memory 282, and/or the like) may transmit an indication of one or more of the respective measurements, as described above.

Process 500 may include additional aspects, such as any single aspect or any combination of aspects described below and/or in connection with one or more other processes described elsewhere herein.

In a first aspect, performing the respective measurements comprises performing the respective measurements based at least in part on an indication in the grant for the downlink transmission to measure the one or more DMRSs. In a second aspect, alone or in combination with the first aspect, each of the one or more DMRSs is transmitted on a narrow beam that is QCL'ed with a narrow beam configured for transmission of a CSI-RS or a TRS. In a third aspect, alone or in combination with one or more of the first and second aspects, process 500 includes receiving another grant that schedules another downlink transmission on a beam that is based at least in part on the respective measurements.

In a fourth aspect, alone or in combination with one or more of the first through third aspects, the beam is QCL'ed with a narrow beam that is configured for transmission of a CSI-RS or a TRS. In a fifth aspect, alone or in combination with one or more of the first through fourth aspects, a first group of the one or more DMRSs is transmitted on a first narrow beam; a second group of the one or more DMRSs is transmitted on a second narrow beam, and process 500 includes performing one or more first receive beam measurements based at least in part on receiving the first group of the one or more DMRSs using a first receive beam of the UE; performing one or more second receive beam measurements based at least in part on receiving the second group of the one or more DMRSs using a second receive beam of the UE; and identifying the first receive beam or the second receive beam for reception of a subsequent downlink transmission based at least in part on the one or more first receive beam measurements and the one or more second receive beam measurements.

In a sixth aspect, alone or in combination with one or more of the first through fifth aspects, transmitting the indication of one or more of the respective measurements comprises transmitting an indication of a single measurement for the first group of the one or more DMRSs, and transmitting an indication of a single measurement for the second group of the one or more DMRSs. In a seventh aspect, alone or in combination with one or more of the first through sixth aspects, transmitting the indication of one or more of the respective measurements comprises transmitting an indication of each respective measurement for the one or more DMRSs.

In an eighth aspect, alone or in combination with one or more of the first through seventh aspects, the first group of the one or more DMRSs and the second group of the one or more DMRSs include different quantities of DMRSs. In a ninth aspect, alone or in combination with one or more of the first through eighth aspects, transmitting the indication of one or more of the respective measurements comprises transmitting the indication of one or more of the respective measurements in a configured CSI report or a configured HARQ-ACK message.

In a tenth aspect, alone or in combination with one or more of the first through ninth aspects, transmitting the indication of one or more of the respective measurements comprises transmitting the indication of one or more of the respective measurements in a standalone beam measurement report. In an eleventh aspect, alone or in combination with one or more of the first through tenth aspects, a MIMO rank of the downlink transmission satisfies a rank threshold, and transmitting the indication of one or more of the respective measurements comprises transmitting the indication of one or more of the respective measurements on each DMRS port of one or more DMRS ports configured for the UE.

In a twelfth aspect, alone or in combination with one or more of the first through eleventh aspects, a MIMO rank of the downlink transmission satisfies a rank threshold, and transmitting the indication of one or more of the respective measurements comprises transmitting the indication of one or more of the respective measurements on a highest ranked DMRS port of one or more DMRS ports configured for the UE. In a thirteenth aspect, alone or in combination with one or more of the first through twelfth aspects, a MIMO rank of the downlink transmission satisfies a rank threshold, and transmitting the indication of one or more of the respective measurements comprises transmitting the indication of one or more of the respective measurements on combined DMRS ports of one or more DMRS ports configured for the UE.

In a fourteenth aspect, alone or in combination with one or more of the first through thirteenth aspects, the UE is assigned to a plurality of QCL groups; performing the respective measurements of the one or more DMRSs comprises performing the respective measurements of the one or more DMRSs for each of the plurality of QCL groups, and transmitting the indication of one or more of the respective measurements comprises transmitting the indication of one or more of the respective measurements for each of the plurality of QCL groups.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
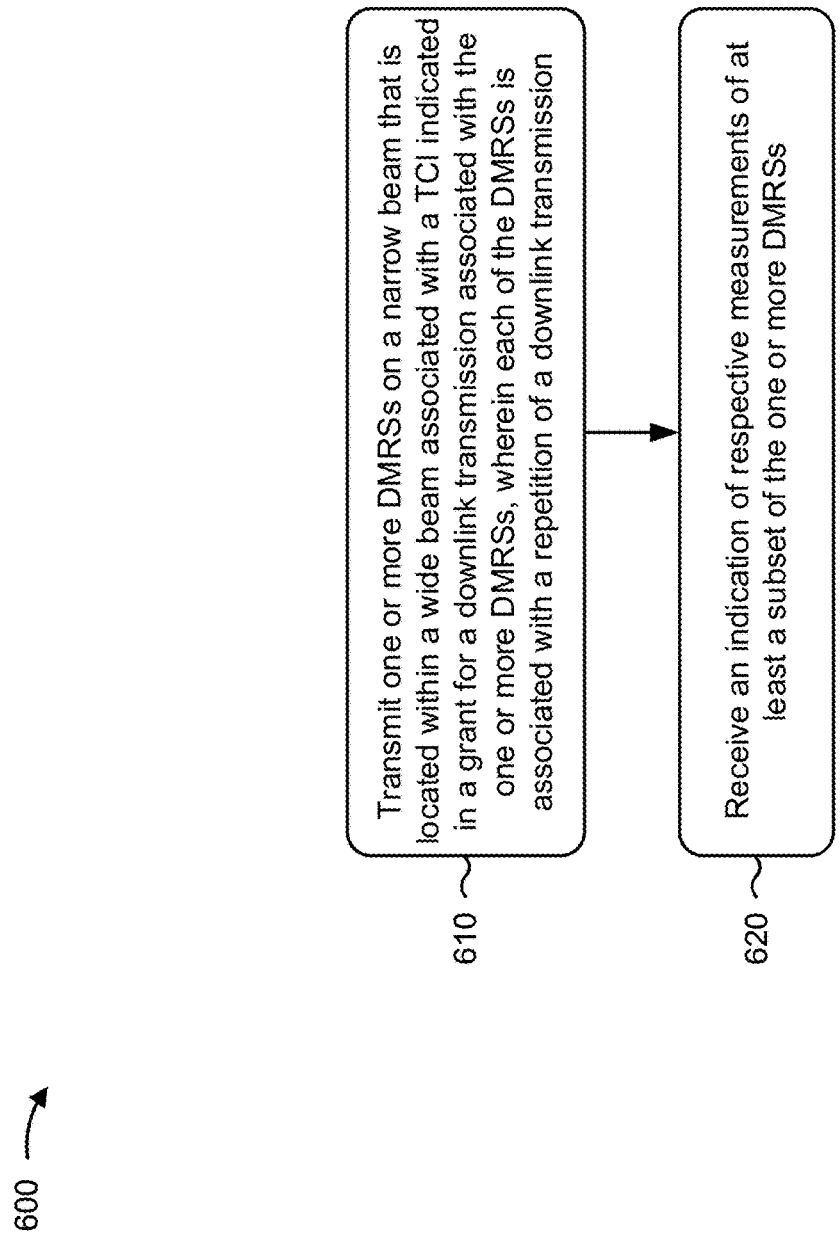
FIG. 6 is a diagram illustrating an example process performed, for example, by a BS, in accordance with various aspects of the present disclosure.

FIG. 6 is a diagram illustrating an example process 600 performed, for example, by a BS, in accordance with various aspects of the present disclosure. Example process 600 is an example where the BS (e.g., BS 110 illustrated and described above in connection with one or more of FIGS. 1-4) performs operations associated with DMRS-based beam management for downlink repetition.

As shown in FIG. 6, in some aspects, process 600 may include transmitting one or more DMRSs on a narrow beam that is located within a wide beam associated with a TCI indicated in a grant for a downlink transmission associated with the one or more DMRSs, wherein each of the DMRSs is associated with a repetition of a downlink transmission (block 610). For example, the BS (e.g., using transmit processor 220, receive processor 238, controller/processor 240, memory 242, and/or the like) may transmit one or more DMRSs on a narrow beam that is located within a wide beam associated with a TCI indicated in a grant for a downlink transmission associated with the one or more DMRSs, as described above. In some aspects, each of the DMRSs is associated with a repetition of a downlink transmission.

As further shown in FIG. 6, in some aspects, process 600 may include receiving an indication of respective measurements of at least a subset of the one or more DMRSs (block 620). For example, the BS (e.g., using transmit processor 220, receive processor 238, controller/processor 240, memory 242, and/or the like) may receive an indication of respective measurements of at least a subset of the one or more DMRSs, as described above.

Process 600 may include additional aspects, such as any single aspect or any combination of aspects described below and/or in connection with one or more other processes described elsewhere herein.

In a first aspect, process 600 includes transmitting an indication in the grant for the downlink transmission to measure the one or more DMRSs. In a second aspect, alone or in combination with the first aspect, transmitting the one or more DMRSs comprises transmitting each of the one or more DMRSs on a narrow beam that is QCL'ed with a narrow beam configured for transmission of a CSI-RS or a TRS. In a third aspect, alone or in combination with one or more of the first and second aspects, process 600 includes determining a beam based at least in part on the respective measurements; and transmitting another grant that schedules another downlink transmission on the beam.

In a fourth aspect, alone or in combination with one or more of the first through third aspects, the beam is QCL'ed with a narrow beam that is configured for transmission of a CSI-RS or a TRS. In a fifth aspect, alone or in combination with one or more of the first through fourth aspects, transmitting the one or more DMRSs comprises transmitting a first group of the one or more DMRSs on a first narrow beam, and transmitting a second group of the one or more DMRSs on a second narrow beam.

In a sixth aspect, alone or in combination with one or more of the first through fifth aspects, receiving the indication of respective measurements of at least the subset of the one or more DMRSs comprises receiving an indication of a single measurement for the first group of the one or more DMRSs, and receiving an indication of a single measurement for the second group of the one or more DMRSs. In a seventh aspect, alone or in combination with one or more of the first through sixth aspects, receiving the indication of respective measurements of at least the subset of the one or more DMRSs comprises receiving an indication of each respective measurement for the one or more DMRSs.

In an eighth aspect, alone or in combination with one or more of the first through seventh aspects, the first group of the one or more DMRSs and the second group of the one or more DMRSs include different quantities of DMRSs. In a ninth aspect, alone or in combination with one or more of the first through eighth aspects, receiving the indication of respective measurements of at least the subset of the one or more DMRSs comprises receiving the indication of respective measurements of at least the subset of the one or more DMRSs in a configured CSI report or a configured HARQ-ACK message.

In a tenth aspect, alone or in combination with one or more of the first through ninth aspects, receiving the indication of respective measurements of at least the subset of the one or more DMRSs comprises receiving the indication of respective measurements of at least the subset of the one or more DMRSs in a standalone beam measurement report. In an eleventh aspect, alone or in combination with one or more of the first through tenth aspects, a MIMO rank of the downlink transmission satisfies a rank threshold, and receiving the indication of respective measurements of at least the subset of the one or more DMRSs comprises receiving the indication of respective measurements of at least the subset of the one or more DMRSs on each DMRS port of one or more DMRS ports configured for a UE.

In a twelfth aspect, alone or in combination with one or more of the first through eleventh aspects, a MIMO rank of the downlink transmission satisfies a rank threshold, and receiving the indication of respective measurements of at least the subset of the one or more DMRSs comprises receiving the indication of respective measurements of at least the subset of the one or more DMRSs on a highest ranked DMRS port of one or more DMRS ports configured for a UE. In a thirteenth aspect, alone or in combination with one or more of the first through twelfth aspects, a MIMO rank of the downlink transmission satisfies a rank threshold, and receiving the indication of respective measurements of at least the subset of the one or more DMRSs comprises receiving the indication of respective measurements of at least the subset of the one or more DMRSs on a combined DMRS ports of one or more DMRS ports configured for a UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of aspects of the present disclosure:

Aspect 1: A method of wireless communication performed by a user equipment (UE), comprising: performing respective measurements of one or more demodulation reference signals (DMRSs), wherein each of the one or more DMRSs is associated with a repetition of a downlink transmission, and wherein each of the one or more DMRSs is transmitted on a narrow beam that is located within a wide beam associated with a transmission configuration indication (TCI) indicated in a grant for the downlink transmission; and transmitting an indication of one or more of the respective measurements.

Aspect 2: The method of aspect 1, wherein performing the respective measurements comprises: performing the respective measurements based at least in part on an indication in the grant for the downlink transmission to measure the one or more DMRSs. Aspect 3: The method of aspect 1 or 2, wherein each of the one or more DMRSs is transmitted on a narrow beam that is quasi-co-located (QCL'ed) with a narrow beam configured for transmission of a channel state information reference signal (CSI-RS) or a tracking reference signal (TRS). Aspect 4: The method of any of aspects 1-3, further comprising: receiving another grant that schedules another downlink transmission on a beam that is based at least in part on the respective measurements.

Aspect 5: The method of aspect 4, wherein the beam is quasi-co-located (QCL'ed) with a narrow beam that is configured for transmission of a channel state information reference signal (CSI-RS) or a tracking reference signal (TRS). Aspect 6: The method of any of aspects 1-5, wherein a first group of the one or more DMRSs is transmitted on a first narrow beam; wherein a second group of the one or more DMRSs is transmitted on a second narrow beam; and wherein the method further comprises: performing one or more first receive beam measurements based at least in part on receiving the first group of the one or more DMRSs using a first receive beam of the UE; performing one or more second receive beam measurements based at least in part on receiving the second group of the one or more DMRSs using a second receive beam of the UE; and identifying the first receive beam or the second receive beam for reception of a subsequent downlink transmission based at least in part on the one or more first receive beam measurements and the one or more second receive beam measurements.

Aspect 7: The method of aspect 6, wherein transmitting the indication of one or more of the respective measurements comprises: transmitting an indication of a single measurement for the first group of the one or more DMRSs; and transmitting an indication of a single measurement for the second group of the one or more DMRSs. Aspect 8: The method of aspect 6, wherein transmitting the indication of one or more of the respective measurements comprises: transmitting an indication of each respective measurement for the one or more DMRSs. Aspect 9: The method of aspect 6, wherein the first group of the one or more DMRSs and the second group of the one or more DMRSs include different quantities of DMRSs.

Aspect 10: The method of any of aspects 1-9, wherein transmitting the indication of one or more of the respective measurements comprises: transmitting the indication of one or more of the respective measurements in a configured channel state information (CSI) report or a configured hybrid automatic repeat request acknowledgement (HARQ- ACK) message. Aspect 11: The method of any of aspects 1-10, wherein transmitting the indication of one or more of the respective measurements comprises: transmitting the indication of one or more of the respective measurements in a standalone beam measurement report.

Aspect 12: The method of any of aspects 1-11, wherein a multiple input multiple output (MIMO) rank of the downlink transmission satisfies a rank threshold; and wherein transmitting the indication of one or more of the respective measurements comprises: transmitting the indication of one or more of the respective measurements on each DMRS port of one or more DMRS ports configured for the UE. Aspect 13: The method of any of aspects 1-11, wherein a multiple input multiple output (MIMO) rank of the downlink transmission satisfies a rank threshold; and wherein transmitting the indication of one or more of the respective measurements comprises: transmitting the indication of one or more of the respective measurements on a highest ranked DMRS port of one or more DMRS ports configured for the UE.

Aspect 14: The method of any of aspects 1-11, wherein a multiple input multiple output (MIMO) rank of the downlink transmission satisfies a rank threshold; and wherein transmitting the indication of one or more of the respective measurements comprises: transmitting the indication of one or more of the respective measurements on combined DMRS ports of one or more DMRS ports configured for the UE. Aspect 15: The method of any of aspects 1-14, wherein the UE is assigned to a plurality of quasi-co-location (QCL) groups; wherein performing the respective measurements of the one or more DMRSs comprises: performing the respective measurements of the one or more DMRSs for each of the plurality of QCL groups; and wherein transmitting the indication of one or more of the respective measurements comprises: transmitting the indication of one or more of the respective measurements for each of the plurality of QCL groups.

Aspect 16: A method of wireless communication performed by a base station (BS), comprising: transmitting one or more demodulation reference signals (DMRSs) on a narrow beam that is located within a wide beam associated with a transmission configuration indication (TCI) indicated in a grant for a downlink transmission associated with the one or more DMRSs, wherein each of the DMRSs is associated with a repetition of a downlink transmission; and receiving an indication of respective measurements of at least a subset of the one or more DMRSs.

Aspect 17: The method of aspect 16, further comprising: transmitting an indication in the grant for the downlink transmission to measure the one or more DMRSs. Aspect 18: The method of aspect 16 or 17, wherein transmitting the one or more DMRSs comprises: transmitting each of the one or more DMRSs on a narrow beam that is quasi-co-located (QCL'ed) with a narrow beam configured for transmission of a channel state information reference signal (CSI-RS) or a tracking reference signal (TRS). Aspect 19: The method of any of aspects 16-18, further comprising: determining a beam based at least in part on the respective measurements; and transmitting another grant that schedules another downlink transmission on the beam. Aspect 20: The method of aspect 19, wherein the beam is quasi-co-located (QCL'ed) with a narrow beam that is configured for transmission of a channel state information reference signal (CSI-RS) or a tracking reference signal (TRS).

Aspect 21: The method of any of aspects 16-20, wherein transmitting the one or more DMRSs comprises: transmitting a first group of the one or more DMRSs on a first narrow beam; and transmitting a second group of the one or more DMRSs on a second narrow beam. Aspect 22: The method of aspect 21, wherein receiving the indication of respective measurements of at least the subset of the one or more DMRSs comprises: receiving an indication of a single measurement for the first group of the one or more DMRSs; and receiving an indication of a single measurement for the second group of the one or more DMRSs. Aspect 23: The method of aspect 21, wherein receiving the indication of respective measurements of at least the subset of the one or more DMRSs comprises: receiving an indication of each respective measurement for the one or more DMRSs.

Aspect 24: The method of aspect 21, wherein the first group of the one or more DMRSs and the second group of the one or more DMRSs include different quantities of DMRSs. Aspect 25: The method of any of aspects 16-24, wherein receiving the indication of respective measurements of at least the subset of the one or more DMRSs comprises: receiving the indication of respective measurements of at least the subset of the one or more DMRSs in a configured channel state information (CSI) report or a configured hybrid automatic repeat request acknowledgement (HARQ-ACK) message.

Aspect 26: The method of any of aspects 16-25, wherein receiving the indication of respective measurements of at least the subset of the one or more DMRSs comprises: receiving the indication of respective measurements of at least the subset of the one or more DMRSs in a standalone beam measurement report. Aspect 27: The method of any of aspects 16-26, wherein a multiple input multiple output (MIMO) rank of the downlink transmission satisfies a rank threshold; and wherein receiving the indication of respective measurements of at least the subset of the one or more DMRSs comprises: receiving the indication of respective measurements of at least the subset of the one or more DMRSs on each DMRS port of one or more DMRS ports configured for a user equipment (UE).

Aspect 28: The method of any of aspects 16-26, wherein a multiple input multiple output (MIMO) rank of the downlink transmission satisfies a rank threshold; and wherein receiving the indication of respective measurements of at least the subset of the one or more DMRSs comprises: receiving the indication of respective measurements of at least the subset of the one or more DMRSs on a highest ranked DMRS port of one or more DMRS ports configured for a user equipment (UE). Aspect 29: The method of any of aspects 16-26, wherein a multiple input multiple output (MIMO) rank of the downlink transmission satisfies a rank threshold; and wherein receiving the indication of respective measurements of at least the subset of the one or more DMRSs comprises: receiving the indication of respective measurements of at least the subset of the one or more DMRSs on a combined DMRS ports of one or more DMRS ports configured for a user equipment (UE).

Aspect 30: An apparatus for wireless communication at a device, comprising a processor; memory coupled with the processor; and instructions stored in the memory and executable by the processor to cause the apparatus to perform the method of one or more aspects of aspects 1-15. Aspect 31: A device for wireless communication, comprising a memory and one or more processors coupled to the memory, the memory and the one or more processors configured to perform the method of one or more aspects of aspects 1-15. Aspect 32: An apparatus for wireless communication, comprising at least one means for performing the method of one or more aspects of aspects 1-15.

Aspect 33: A non-transitory computer-readable medium storing code for wireless communication, the code comprising instructions executable by a processor to perform the method of one or more aspects of aspects 1-15. Aspect 34: A non-transitory computer-readable medium storing a set of instructions for wireless communication, the set of instructions comprising one or more instructions that, when executed by one or more processors of a device, cause the device to perform the method of one or more aspects of aspects 1-15.

Aspect 35: An apparatus for wireless communication at a device, comprising a processor; memory coupled with the processor; and instructions stored in the memory and executable by the processor to cause the apparatus to perform the method of one or more aspects of aspects 16-29. Aspect 36: A device for wireless communication, comprising a memory and one or more processors coupled to the memory, the memory and the one or more processors configured to perform the method of one or more aspects of aspects 16-29. Aspect 37: An apparatus for wireless communication, comprising at least one means for performing the method of one or more aspects of aspects 16-29.

Aspect 38: A non-transitory computer-readable medium storing code for wireless communication, the code comprising instructions executable by a processor to perform the method of one or more aspects of aspects 16-29. Aspect 39: A non-transitory computer-readable medium storing a set of instructions for wireless communication, the set of instructions comprising one or more instructions that, when executed by one or more processors of a device, cause the device to perform the method of one or more aspects of aspects 16-29.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   performing respective measurements of one or more demodulation reference signals (DMRSs),
      wherein each of the one or more DMRSs is associated with a repetition of a downlink transmission, and
      wherein each of the one or more DMRSs is transmitted on a narrow beam that is located within a wide beam associated with a transmission configuration indication (TCI) indicated in a grant for the downlink transmission; and
   transmitting an indication of one or more of the respective measurements.

2. The method of claim 1, wherein performing the respective measurements comprises:
   performing the respective measurements based at least in part on an indication in the grant for the downlink transmission to measure the one or more DMRSs.

3. The method of claim 1, wherein each of the one or more DMRSs is transmitted on a narrow beam that is quasi-co-located (QCL'ed) with a narrow beam configured for transmission of a channel state information reference signal (CSI-RS) or a tracking reference signal (TRS).

4. The method of claim 1, further comprising:
   receiving another grant that schedules another downlink transmission on a beam that is based at least in part on the respective measurements.

5. The method of claim 4, wherein the beam is quasi-co-located (QCL'ed) with a narrow beam that is configured for transmission of a channel state information reference signal (CSI-RS) or a tracking reference signal (TRS).

6. The method of claim 1, wherein a first group of the one or more DMRSs is transmitted on a first narrow beam;
   wherein a second group of the one or more DMRSs is transmitted on a second narrow beam; and
   wherein the method further comprises:
      performing one or more first receive beam measurements based at least in part on receiving the first group of the one or more DMRSs using a first receive beam of the UE;
      performing one or more second receive beam measurements based at least in part on receiving the second group of the one or more DMRSs using a second receive beam of the UE; and
      identifying the first receive beam or the second receive beam for reception of a subsequent downlink transmission based at least in part on the one or more first receive beam measurements and the one or more second receive beam measurements.

7. The method of claim 6, wherein transmitting the indication of one or more of the respective measurements comprises:
transmitting an indication of a single measurement for the first group of the one or more DMRSs; and
transmitting an indication of a single measurement for the second group of the one or more DMRSs.

8. The method of claim 6, wherein transmitting the indication of one or more of the respective measurements comprises:
transmitting an indication of each respective measurement for the one or more DMRSs.

9. The method of claim 6, wherein the first group of the one or more DMRSs and the second group of the one or more DMRSs include different quantities of DMRSs.

10. The method of claim 1, wherein transmitting the indication of one or more of the respective measurements comprises:
transmitting the indication of one or more of the respective measurements in a configured channel state information (CSI) report or a configured hybrid automatic repeat request acknowledgement (HARQ-ACK) message.

11. A method of wireless communication performed by a base station (BS), comprising:
transmitting one or more demodulation reference signals (DMRSs) on a narrow beam that is located within a wide beam associated with a transmission configuration indication (TCI) indicated in a grant for a downlink transmission associated with the one or more DMRSs, wherein each of the DMRSs is associated with a repetition of a downlink transmission; and
receiving an indication of respective measurements of at least a subset of the one or more DMRSs.

12. The method of claim 11, further comprising:
transmitting an indication in the grant for the downlink transmission to measure the one or more DMRSs.

13. The method of claim 11, wherein transmitting the one or more DMRSs comprises:
transmitting each of the one or more DMRSs on a narrow beam that is quasi-co-located (QCL'ed) with a narrow beam configured for transmission of a channel state information reference signal (CSI-RS) or a tracking reference signal (TRS).

14. The method of claim 11, further comprising:
determining a beam based at least in part on the respective measurements; and
transmitting another grant that schedules another downlink transmission on the beam.

15. The method of claim 14, wherein the beam is quasi-co-located (QCL'ed) with a narrow beam that is configured for transmission of a channel state information reference signal (CSI-RS) or a tracking reference signal (TRS).

16. The method of claim 11, wherein transmitting the one or more DMRSs comprises:
transmitting a first group of the one or more DMRSs on a first narrow beam; and
transmitting a second group of the one or more DMRSs on a second narrow beam.

17. The method of claim 16, wherein receiving the indication of respective measurements of at least the subset of the one or more DMRSs comprises:
receiving an indication of a single measurement for the first group of the one or more DMRSs; and
receiving an indication of a single measurement for the second group of the one or more DMRSs.

18. The method of claim 16, wherein receiving the indication of respective measurements of at least the subset of the one or more DMRSs comprises:
receiving an indication of each respective measurement for the one or more DMRSs.

19. A user equipment (UE) for wireless communication, comprising:
a memory; and
one or more processors operatively coupled to the memory, the memory and the one or more processors configured to:
perform respective measurements of one or more demodulation reference signals (DMRSs),
wherein each of the one or more DMRSs is associated with a repetition of a downlink transmission, and
wherein each of the one or more DMRSs is transmitted on a narrow beam that is located within a wide beam associated with a transmission configuration indication (TCI) indicated in a grant for the downlink transmission; and
transmit an indication of one or more of the respective measurements.

20. The UE of claim 19, wherein the one or more processors, when transmitting the indication of one or more of the respective measurements, are configured to:
transmit the indication of one or more of the respective measurements in a standalone beam measurement report.

21. The UE of claim 19, wherein a multiple input multiple output (MIMO) rank of the downlink transmission satisfies a rank threshold; and
wherein the one or more processors, when transmitting the indication of one or more of the respective measurements, are configured to:
transmit the indication of one or more of the respective measurements on each DMRS port of one or more DMRS ports configured for the UE.

22. The UE of claim 19, wherein a multiple input multiple output (MIMO) rank of the downlink transmission satisfies a rank threshold; and
wherein the one or more processors, when transmitting the indication of one or more of the respective measurements, are configured to:
transmit the indication of one or more of the respective measurements on a highest ranked DMRS port of one or more DMRS ports configured for the UE.

23. The UE of claim 19, wherein a multiple input multiple output (MIMO) rank of the downlink transmission satisfies a rank threshold; and
wherein the one or more processors, when transmitting the indication of one or more of the respective measurements, are configured to:
transmit the indication of one or more of the respective measurements on combined DMRS ports of one or more DMRS ports configured for the UE.

24. The UE of claim 19, wherein the UE is assigned to a plurality of quasi-co-location (QCL) groups;
wherein the one or more processors, when performing the respective measurements of the one or more DMRSs, are configured to:
perform the respective measurements of the one or more DMRSs for each of the plurality of QCL groups; and wherein the one or more processors, when transmitting the indication of one or more of the respective measurements, are configured to:
    transmit the indication of one or more of the respective measurements for each of the plurality of QCL groups.

25. A base station (BS) for wireless communication, comprising:
    a memory; and
    one or more processors operatively coupled to the memory, the memory and the one or more processors configured to:
        transmit one or more demodulation reference signals (DMRSs) on a narrow beam that is located within a wide beam associated with a transmission configuration indication (TCI) indicated in a grant for a downlink transmission associated with the one or more DMRSs,
            wherein each of the DMRSs is associated with a repetition of a downlink transmission; and
        receive an indication of respective measurements of at least a subset of the one or more DMRSs.

26. The BS of claim 25, wherein the one or more processors, when receiving the indication of respective measurements of at least the subset of the one or more DMRSs, are configured to:
    receive the indication of respective measurements of at least the subset of the one or more DMRSs in a configured channel state information (CSI) report or a configured hybrid automatic repeat request acknowledgement (HARQ-ACK) message.

27. The BS of claim 25, wherein the one or more processors, when receiving the indication of respective measurements of at least the subset of the one or more DMRSs, are configured to:
    receive the indication of respective measurements of at least the subset of the one or more DMRSs in a standalone beam measurement report.

28. The BS of claim 25, wherein a multiple input multiple output (MIMO) rank of the downlink transmission satisfies a rank threshold; and
    wherein receiving the indication of respective measurements of at least the subset of the one or more DMRSs comprises:
        receiving the indication of respective measurements of at least the subset of the one or more DMRSs on each DMRS port of one or more DMRS ports configured for a user equipment (UE).

29. The BS of claim 25, wherein a multiple input multiple output (MIMO) rank of the downlink transmission satisfies a rank threshold; and
    wherein the one or more processors, when receiving the indication of respective measurements of at least the subset of the one or more DMRSs, are configured to:
        receive the indication of respective measurements of at least the subset of the one or more DMRSs on a highest ranked DMRS port of one or more DMRS ports configured for a user equipment (UE).

30. The BS of claim 25, wherein a multiple input multiple output (MIMO) rank of the downlink transmission satisfies a rank threshold; and
    wherein the one or more processors, when receiving the indication of respective measurements of at least the subset of the one or more DMRSs, are configured to:
        receive the indication of respective measurements of at least the subset of the one or more DMRSs on a combined DMRS ports of one or more DMRS ports configured for a user equipment (UE).

* * * * *